United States Patent [19]

Thomas

[11] 4,448,429
[45] May 15, 1984

[54] ELASTOMER ENERGIZED SEAL

[75] Inventor: Guy A. Thomas, Oxnard, Calif.

[73] Assignee: W. S. Shamban & Company, Santa Monica, Calif.

[21] Appl. No.: 429,857

[22] Filed: Sep. 30, 1982

[51] Int. Cl.³ ............................................... F16J 15/32
[52] U.S. Cl. .................................... 277/165; 277/209; 277/213
[58] Field of Search ............ 277/165, 207 R, 208–210, 277/177, 184, 186, 205, 213, 207 A

[56] References Cited

U.S. PATENT DOCUMENTS

| Re. 28,105 | 8/1974 | Traub | 277/165 |
|---|---|---|---|
| 2,841,429 | 7/1958 | McCuistion | 277/206 A X |
| 2,893,795 | 7/1959 | Dooling | 277/177 |
| 3,149,848 | 9/1964 | Galloway | 277/165 |
| 3,418,001 | 12/1968 | Rentschler et al. | 277/177 X |
| 3,885,800 | 5/1975 | Sievenpiper | 277/165 |
| 4,244,280 | 1/1981 | Stoll | 277/165 X |

FOREIGN PATENT DOCUMENTS

| 647450 | 8/1962 | Canada | 277/209 |
|---|---|---|---|
| 550298 | 12/1922 | France | 277/208 |
| 1041441 | 9/1966 | United Kingdom | 277/207 A |
| 1288665 | 9/1972 | United Kingdom | 277/188 A |

Primary Examiner—Robert S. Ward
Attorney, Agent, or Firm—Poms, Smith, Lande & Rose

[57] ABSTRACT

An expander ring for use in elastomer energized seal assemblies. The expander ring includes two annular lobe portions interconnected by an integral center portion. Each lobe portion is provided with annular pressure ridges for providing localized annular pressure loading of the seal edges to prevent leakage of hydraulic fluid when the seal is in a low pressure environment.

16 Claims, 6 Drawing Figures

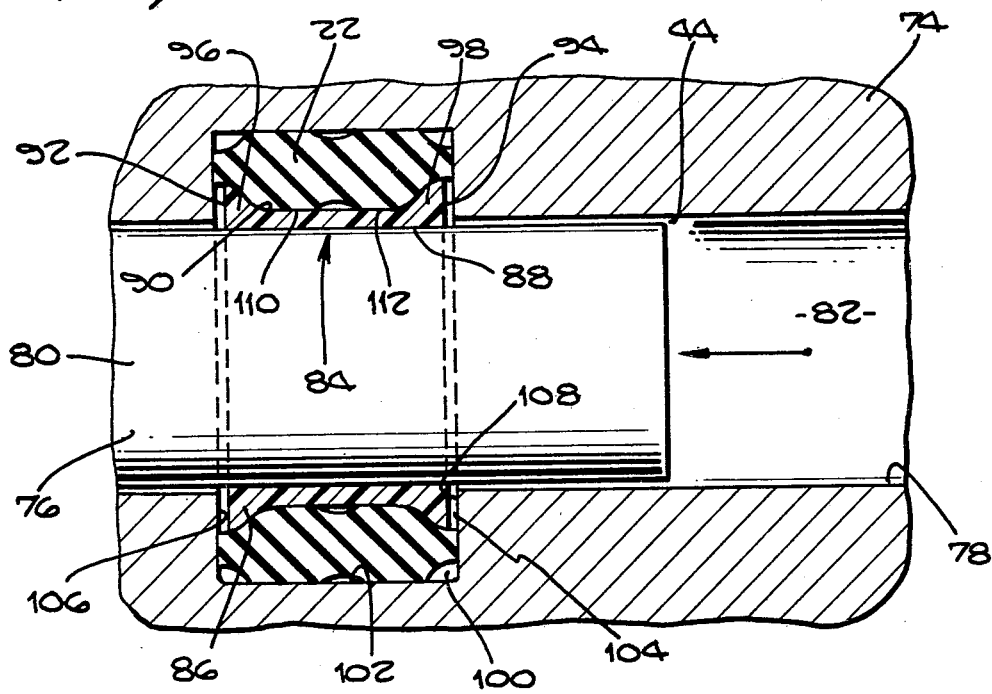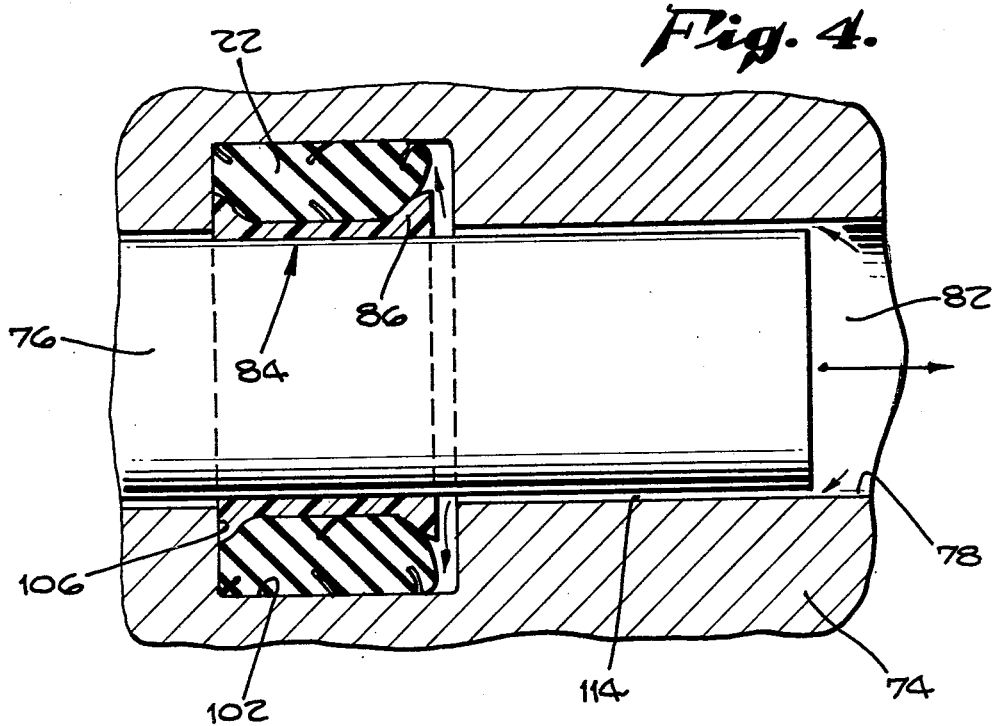

ELASTOMER ENERGIZED SEAL

BACKGROUND OF THE INVENTION

The present invention relates generally to seals designed to prevent the leakage of fluid between mating surfaces. More particularly, the present invention is directed to elastomer energized seal assemblies for use in both high and low pressure hydraulic systems.

The adequate sealing of hydraulic devices to prevent fluid leakage is of major importance to the design, construction and operation of hydraulic equipment. Adequate seals and sealing assemblies are important in providing proper operation of high and low pressure hydraulic devices such as landing gear struts, hydraulic power tools, hydraulic actuators, valves, swivel glands and any other hydraulic devices of apparatus.

The sealing of hydraulic devices basically involve preventing hydraulic fluid from leaking between two or more mating surfaces. The mating surfaces may be relatively reciprocal as in landing gear struts or hydraulic power tools. For static hydraulic devices, such as hydraulic actuators, the mating surfaces may remain static. Further, the mating surfaces may rotate or oscillate relative each other with or without longitudinal movement.

The mating surfaces are typically cylindrical surfaces with numerous other surface configurations being possible. The mating surfaces are separated by a small gap to allow movement of the two surfaces relative each other during operation or initial assembly. In general, a seal assembly is mounted within a groove in one of the surfaces and extends annularly across the gap between the two surfaces for sealing against the other surface.

The cross section of a seal assembly commonly used for hydraulic seals is shown generally in FIG. 5 at 9. The seal 9 is commonly referred to as an elastomer energized seal. The elastomer energized seal 9 includes a plastic cap or sealing ring 10 which is energized against the mating surface to be sealed 18 by an elastomer expander ring 12. Expander rings, such as expander ring 12, are also commonly referred to as "pressure rings" or "support rings".

As with other conventional O-ring type seals, the elastomer energized seal assembly 9 is mounted within groove 14 in the other mating surface 16. The seal assembly 9 is designed to prevent leakage of hydraulic fluid through gap 20 between the mating surfaces 16 and 18. The seal assembly 9 includes three leak surfaces or gaps through which hydraulic fluid may leak past the seal. The first leakage surface is between the expander ring 12 and the bottom of groove 14 in mating surface 16. The second leak surface is between the expander ring 12 and sealing ring 10. The third leak surface is between the sealing ring 10 and the mating surface 18.

The cap ring 10 shown in FIG. 5 is conventionally made from a plastic material, such as TEFLON (polytetrafluoroethylene). The expander ring 12 is typically made from elastic materials such as natural rubber and synthetic equivalents having similar elastic properties.

When the hydraulic fluid in gap 20 is under high pressure, the expander ring 12 is energized to force sealing ring 10 against mating surface 18. In this high pressure environment, little if any hydraulic fluid leaks past the sealing ring 10 or other leak surfaces. However, in low pressure hydraulic devices and during the low pressure mode or cycle of high pressure devices, the expander ring 12 is no longer energized and leakage of hydraulic fluid may occur. At these low pressures, the amount of fluid leakage past the seal is dependent upon the amount of pressure which the expander ring 12 exerts against the sealing ring 10 and the other leak surfaces. The pressure exerted by the expander ring is determined by the particular properties of the elastomer being used and the design of the expander.

Teflon is preferred as a sealing ring material since it provides a good seal under high pressures while functioning as a solid lubricant. However, due to its inherent in elasticity, the TEFLON must be continually pressurized against the surface to be sealed to prevent leakage when low pressures are present in the hydraulic device. If the mating surfaces are moved relative each other in such a low hydraulic pressure environment, a thin film of hydraulic fluid will be allowed to pass between the sealing ring and the surface against which it is forced. The thickness of hydraulic fluid film will be dependent upon the amount of unit loading or pressurization provided by the expander ring 12 against the sealing ring 10. As will be realized, the amount of leakage of hydraulic fluid past seal assembly 9 will be directly related in part to the thickness of this film which is allowed to pass by the seal assembly.

Low pressure leakage of hydraulic fluid past seal assemblies such as the one shown in FIG. 5 is also a problem for rotary, oscillatory and static hydraulic environments. Even without longitudinal movement of the mating surfaces relative each other, hydraulic fluid will tend to leak past the seal assembly during low pressure conditions due to the decreased pressurization of the sealing ring against the mating surface as well as the other two leak surfaces.

For expander rings made from the same elastic material, the amount of pressurization which can be obtained from the expander ring and the distribution of the pressure depends to a large extent upon the expander ring shape. The expander ring 12 shown in FIG. 5 provides pressure application across the entire cap ring or sealing ring 10. The amount of sealing ring energization available from such a expander ring design is limited. Increases in sealing ring pressurization can be achieved by increasing the amount of elastic material in the expander ring 12; however, the amount of elastic material which can be compressed into groove 14 is limited.

In order to provide higher pressure support to cap rings during low hydraulic pressure operation, an expander ring such as the one shown at 22 at FIG. 6 was developed. The expander ring 22 includes pressure ridges 24 and 26 which extend annularly around the expander ring 22. These pressure ridges are designed to provide localized increased pressure or unit loading annularly around the cap ring to reduce low pressure fluid leakage past the seal.

Although the expander ring shown in FIG. 6 has provided seal ring pressurization at low hydraulic pressures, the expander ring does not provide high enough unit loading to prevent entirely fluid leakage from occurring at low hydraulic pressures even though the total force may be equivalent to that provided by the expander shown in FIG. 2. Accordingly, there is a continuing need to provide an elastomer energized seal assembly in which the expander ring provides maximum pressurization of the cap ring at low hydraulic pressures to reduce fluid leakage to even lower levels.

SUMMARY OF THE INVENTION

The present invention provides an improved elastomer energized seal assembly in which the expander ring is designed to provide two locations of maximum pressure to the sealing ring during low pressure operation. The seal assembly may be used for sealing static, rotary, oscillatory and reciprocating mating surfaces.

The seal assembly in accordance with the present invention is mounted within a groove in one of the mating surfaces for sealing contact with the other mating surface. The seal assembly includes a conventional annular cap ring having a sealing surface for contact with the other mating surface. The cap ring or sealing ring also includes first and second edges and a support surface which seats against the expander ring.

In accordance with the present invention, a resilient expander ring is provided which has a bottom and first and second side surfaces for seating within the seal assembly mounting groove and a top surface for seating against the cap ring support surface. The expander ring further includes a first pressure ridge extending along the expander ring top surfaces near one edge of the side surfaces. A second pressure ridge is provided extending along the top surface next to the other expander ring side surface. The two pressure ridges provide increased unit loading near the top ring edges during low hydraulic pressures. Such increased local pressurization of the cap ring near the cap ring edges has been found to reduce the amount of hydraulic fluid leakage past the seal assembly at low hydraulic pressures.

As a further feature of the present invention, the expander ring includes two lobe portions which are integrally connected by a center portion. The lobe portions have arcuate top and bottom surfaces with the pressure ridges for the expander ring being located at the apex of the arcuate surfaces. The center portion of the expander ring along with the outer side surfaces are thinner than the two lobe portions to allow room for expansion of the expander ring and to optimize the unit loading provided by the pressure ridges.

The above described features and attendant advantages of the present invention will become apparent as the invention becomes better understood by reference to the following detailed description when considered in conjunction with the accompanying drawings.

BRIEF DESCRIPTION OF THE DRAWINGS

FIG. 3 is a sectional view of an exemplary hydraulic device including a preferred seal assembly in accordance with the present invention. The hydraulic device is FIG. 3 is shown in its low pressure position.

FIG. 4 is a view of the same device as shown in FIG. 3 except that the device has been moved to its high pressure position.

DETAILED DESCRIPTION OF THE INVENTION

Figure 1:
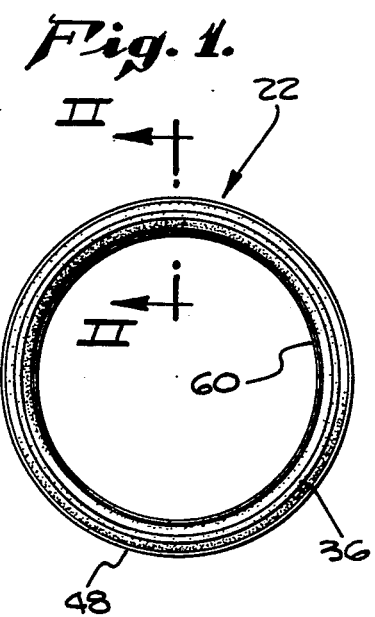
FIG. 1 is a side view of a preferred expander ring in accordance with the present invention.
Figure 5:
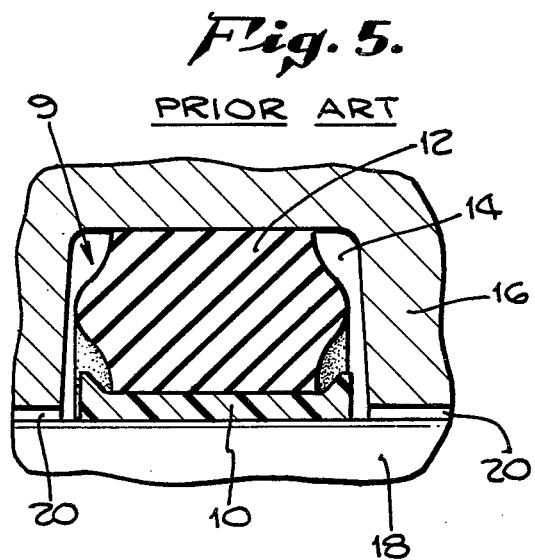
FIG. 5 is a sectional view of a prior art elastomer energized seal assembly mounted in an exemplary hydraulic device.

A preferred exemplary expander ring in accordance with the present invention is shown generally at 22 in FIG. 1. The expander ring 22 is an annular resilient or elastic band or ring. The expander ring 22 may be made from any suitable elastic material commonly used for energizing and supporting annular cap rings. Any number of different suitable elastomeric compounds may be utilized including natural rubber, synthetic rubbers and any of the common elastomeric materials conventionally used for expander rings.

The expander ring 22 is shown as an annular ring for sealing two mating cylindrical surfaces. Of course, the expander ring may be shaped for use in sealing a wide variety of non-cylindrical mating surfaces. For the purposes of this specification, the use of a preferred expander ring for sealing relatively reciprocal mating cylindrical surfaces will be given with it being understood that the expander ring may be used in seal assemblies for sealing a wide variety of mating surfaces. Further, even though the following description will deal with the sealing of relatively reciprocal mating surfaces, the expander ring may be used in seal assemblies for sealing static, oscillating and rotating mating surfaces.

Figure 2:
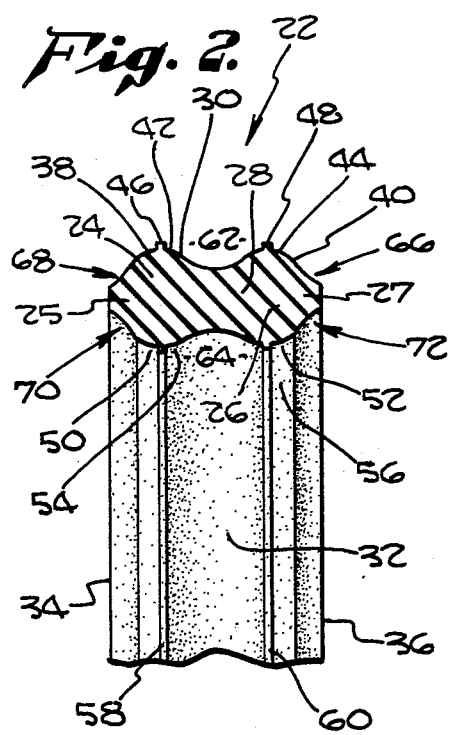
FIG. 2 is a sectional view of FIG. 1 taken in the II—II plane.

As shown in FIG. 2, the expander ring 22 includes a first annular lobe portion 24 and a second annular lobe portion 26. The two lobe portions 24 and 26 are connected by annular center portion 28. The lobe portions 24 and 26 and center portion 28 are preferably formed integrally during molding of the expander ring 22.

For the purpose of this description, the expander ring 22 will be defined as having a bottom or outer surface 30, a top or inner surface 32, a left side 34 and right side 36. The lobe portions 24 and 26 preferably have arcuate outer surfaces 38 and 40 respectively. The first lobe outer arcuate surface 38 includes an outermost portion defining an apex 42. The second lobe outer arcuate surface 40 includes an outermost portion defining an apex 44.

First annular pressure ridge means, such as pressure ridge 46, is provided extending around expander ring 22 at the first lobe apex 42. Second annular pressure ridge means, such as pressure ridge 48, is provided extending around the expander ring 22 at the second lobe apex 44. Preferably, pressure ridges 46 and 48 are molded as an integral part of the expander ring 22. The particular size and shape of the pressure ridges is not particularly critical so long as they provide increased annularly localized pressurization or unit loading of the cap ring.

The first and second lobe inside surfaces 50 and 52 are also preferably arcuate surfaces as shown in FIG. 2. The first lobe inside arcuate surface 50 includes an outer portion 54 defining an apex. The second lobe inside arcuate surface 52 also includes an outer most portion defining an apex 56. Annular pressure ridges 58 and 60 are located at the first and second lobe apexes 54 and 60 respectively.

It is preferred that the expander ring center portion 28 be thinner than the lobe portions 24 and 26 as shown in FIG. 2. This provides annular expansion zones 62 and 64 into which the lobe portions may expand during high temperature seal operation or during expander ring 22 compression. Further, it is preferred that the expander ring side surfaces 34 and 36 also be thinner than the lobe portions 24 and 26 as shown in FIG. 2 to provide added expansion zones shown generally at 66, 68, 70 and 72.

Referring now to FIG. 3, an exemplary hydraulic device utilizing a preferred elastomer energized seal assembly in accordance with the present invention is shown. The hydraulic device includes an outer tube 74 and inner rod 76 defining two relatively reciprocal members having mating cylindrical surfaces 78 and 80 respectively. The tube 74 and rod 76 can be part of any number of hydraulic devices, apparatus or systems. In operation, hydraulic fluid in fluid reservoir 82 is pressurized by movement of rod 76 to the right as shown in FIG. 4. This type of arrangement is commonly used in shock absorbing devices, such as landing gear struts.

Referring again to FIG. 3, the exemplary elastomer energized seal assembly is shown generally at 84. The assembly 84 includes expander ring 22 and cap ring 86. The cap ring includes a sealing surface 88 for sealing contact with cylindrical surface 80. The cap ring 86 also includes a support surface 90 and first and second edges 92 and 94 respectively. The cap ring 86 includes edge ridges 96 and 98 which are shaped to fit matingly against the expander ring 22 as shown.

Figure 6:
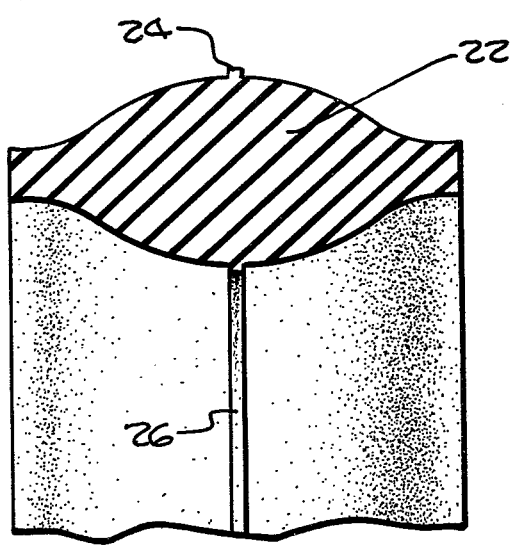
FIG. 6 is a sectional view of a prior art expander ring.

The seal assembly 84 is mounted within groove 100 in tube 74. The groove 100 includes a bottom surface 102, an open top 104 and sides 106 and 108. The expander ring 22 is mounted outside of or below the cap ring 86 in groove 100. The expander ring 22 and groove 100 are sized so that the expander ring 22 is slightly compressed as shown in FIG. 3. This slight compression of expander ring 22 provides the desired support and pressurization of cap ring 86 during the low pressure mode. The pressure ridges 58 and 60 are compressed inward to provide localized annular pressure areas at 110 and 112. The use of individual pressure ridges to provide localized energizing of seals is known as shown in FIG. 6.

The piston or rod 76 in FIG. 3 is being extended so that the hydraulic fluid is under low pressure. This is the low pressure mode. In this position, the hydraulic fluid in reservoir 82 is not highly pressurized. Accordingly, the pressure exerted by hydraulic fluid through annular gap 114 against the seal assembly 84 is at its lowest level. As previously discussed, during this low pressure mode, a thin film of hydraulic fluid will pass between the cap ring sealing surface 88 and the piston surface 80 as the piston is extended. The particular design of expander ring 22 has been found to achieve increased levels of unit loading from the expander ring while providing such increased unit loading levels at spaced locations near the cap ring edges 92 and 94 to thereby minimize leakage of hydraulic fluid past the seal assembly 84 during the low pressure mode.

In FIG. 4, the piston or rod 82 is shown in its retracted or compressed position. In this position, the hydraulic fluid in reservoir 82 is pressurized at high pressure. The pressure loading of seal assembly 84 results in deformation of the expander ring 22. During high pressure loading, the extreme deformation and pressurization of the expander ring 12 provides increased pressurization of the cap ring 86 against piston 80. The pressure which the deformed and pressurized expander ring 22 exerts against sealing ring 86 is sufficient to effectively prevent any leakage of fluid during the high pressure compression stroke as shown in FIG. 4. The pressurized loading of various different expander rings is approximately the same regardless of the elastomer configuration. This is due, in part, to the unavoidable compression and deformation of the expander ring when high pressures are applied. The design of expander ring 22 is therefore only important in providing increased cap ring pressurizations during the low pressure mode.

As shown in FIG. 2, the preferred expander ring 22 includes pressure ridges on both the expander ring outer and inner surfaces 30 and 32 this particular design is believed to provide increased unit loading of the cap ring during low pressure hydraulic device operation. Further, the presence of pressure ridges on both the inner and outer expander ring surfaces allows the use of the expander ring for supporting both inner cap rings such as cap ring 86 shown in FIG. 3 and outer cap rings (not shown) used for sealing cylindrical surfaces located radially outwardly from the seal assembly.

If desired, pressure ridges can be provided only around the expander ring surface which contacts the cap ring; however, as mentioned above, expander rings having pressure ridges on both inside and outside surfaces are preferred. Further, it is preferred that the lobe portions 24 and 26 taper gradually outwards towards the left and right side surfaces 34 and 36 to provide protruding expander ring edge portions 25 and 27. The protruding edge portions 25 and 27 abut against the side walls of the seal assembly mounting groove. It is believed that the tapered protruding edge portions 25 and 27 located on the outside of the lobe portions of the expander ring increase the unit loading available from the pressure ridges.

The cross sectional design of the expander ring including the arcuate lobe portions, protruding edges and tapered center portion along with the pressure ridges located at the lobe apexes provide an especially desirable expander ring which improves low pressure sealing characteristics of cap ring seal assemblies.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. An expander adapted for use in supporting a cap seal for preventing the leakage of fluid past two members having mating surfaces, one of said surfaces having a groove for housing said expander and cap seal, said groove having a bottom surface, sides and an open top, said expander being mounted below said cap seal in said groove and being sized for pressuring said cap seal against the other of said surfaces to prevent said fluid leakage therebetween, said expander comprising:

a resilient body having a first lobe portion and a second lobe portion, said lobe portions being integrally connected by a center portion, said lobe portions having arcuate top surfaces with an outermost portion defining an apex, outer side surfaces and bottom surfaces, wherein each of said lobe portion top surfaces includes a pressure ridge located at said top surface apex for applying spaced localized pressure to said cap seal to provide said seal between said cap seal and said other surfaces.

2. An expander according to claim 1 wherein said annular center portion is thinner than said lobe portions to provide expansion zones between said lobe portions into which said lobes may expand during thermal expansion or during expander compression.

3. An expander according to claim 2 wherein said lobe portion bottom surfaces are arcuate with an outermost portion defining an apex.

4. An expander according to claim 3 wherein a third pressure ridge is located on said first lobe bottom surface at said apex and a fourth pressure ridge is located on said second lobe bottom surface at said apex.

5. An expander according to claim 2 wherein said lobes include outer side portions for contacting said groove sides which are thinner than said lobe portions to provide expansion zones between said lobe portions and said groove sides into which said lobes may expand during thermal expansion or during expander compression.

6. An expander ring according to claim 1 wherein said expander is a resilient annular ring.

7. An expander ring adapted for use in supporting a cap ring for preventing the leakage of fluid past two relatively reciprocable members having mating cylindrical surfaces, one of said surfaces having an annular groove for housing said expander ring and cap ring, said groove having a bottom surface, sides and an open top, said expander ring being mounted below said cap ring in said groove and being sized for pressuring said cap ring against the other of said surfaces to prevent said fluid leakage therebetween, said expander ring comprising:
a resilient annular ring having a first lobe portion and a second lobe portion, said lobe portions being integrally connected by a center portion, said lobe portions having arcuate top surfaces with an outermost portion defining an apex, outer side surfaces and bottom surfaces, wherein each of said lobe portion top surfaces includes a pressure ridge located at said top surface apex for applying spaced localized pressure to said cap ring to provide said seal between said cap ring and said other surface.

8. A seal assembly for preventing the leakage of fluid past two members having mating surfaces, one of said surfaces having an annular groove in which said seal assembly is housed for sealing to the other surface, said seal assembly comprising:
a cap seal having a sealing surface for sealing contact with said other surface, first and second edges and a supporting surface;
a resilient expander having a first lobe portion and a second lobe portion, said lobe portions being integrally connected by a center portion, said lobe portions each having an arcuate top surface with an outermost portion defining an apex, said expander being sized for pressuring said cap seal against the other of said surfaces to prevent said fluid leakage when said seal assembly is mounted within said groove;
first pressure ridge means extending outward from said first lobe apex near said expander first side for providing localized pressure to said cap seal near said cap seal first edge; and
second pressure ridge means extending outward from said second lobe apex near said expander second side for providing annular localized pressure to said cap seal near said cap seal second edge to thereby provide localized pressurization of said cap seal near said cap seal edges to prevent leakage of fluid past said seal assembly.

9. A seal assembly according to claim 8 wherein cap seal is an annular ring and said expander is a resilient annular ring.

10. A seal assembly according to claim 8 wherein said expander ring center portion is thinner than said lobe portions to provide annular expansion zones between said lobe portions into which said lobes may expand during thermal expansion or during expander ring compression.

11. A seal assembly according to claim 8 wherein said first and second pressure ridge means are formed integrally as part of said expander ring top surface as a ridge extending outward from and around said apex.

12. A seal assembly according to claim 8 wherein said lobe portion bottom surfaces are arcuate with an outermost portion defining an apex.

13. A seal assembly according to claim 12 wherein a pressure ridge is located on each of said lobe portion bottom surfaces at said apex.

14. A seal assembly according to claim 8 wherein said lobes include outer side portions which are thinner than said lobe portions to provide expansion zones between said lobe portions and the groove walls into which said lobes may expand during thermal expansion or during expander ring compression.

15. An expander ring adapted for use in supporting a cap ring for preventing the leakage of fluid past two members having mating cylindrical surfaces, said expander ring comprising:
a resilient annular ring having a first annular lobe portion with a radially inward surface, a radially outward surface and an outer side surface, a second annular lobe portion with a radially inward surface, a radially outward surface and an outer side surface and an annular middle portion of thinner cross section than said lobe portions integrally connecting said lobe portions, said first and second lobe portions both having arcuate cross-sections defining arcuate surfaces on at least one of the radially inward or outward surfaces said arcuate surfaces having apex portions;
a first annular pressure ridge integrally extending outward from and annularly around said first lobe portion arcuate surface for providing localized annular pressure to said cap ring;
a second annular pressure ridge integrally extending around said second lobe portion arcuate surface for providing localized annular pressure to said cap ring, said lobe apex portions being displaced by said middle portion at sufficiently spaced locations to provide said localized pressure near the edges of said cap ring to thereby prevent leakage of fluid inward past said cap ring edges.

16. An expander ring according to claim 15 wherein said lobe portions taper towards said outer side surfaces to provide protruding expander ring edge portions.

* * * * *